UNITED STATES PATENT OFFICE.

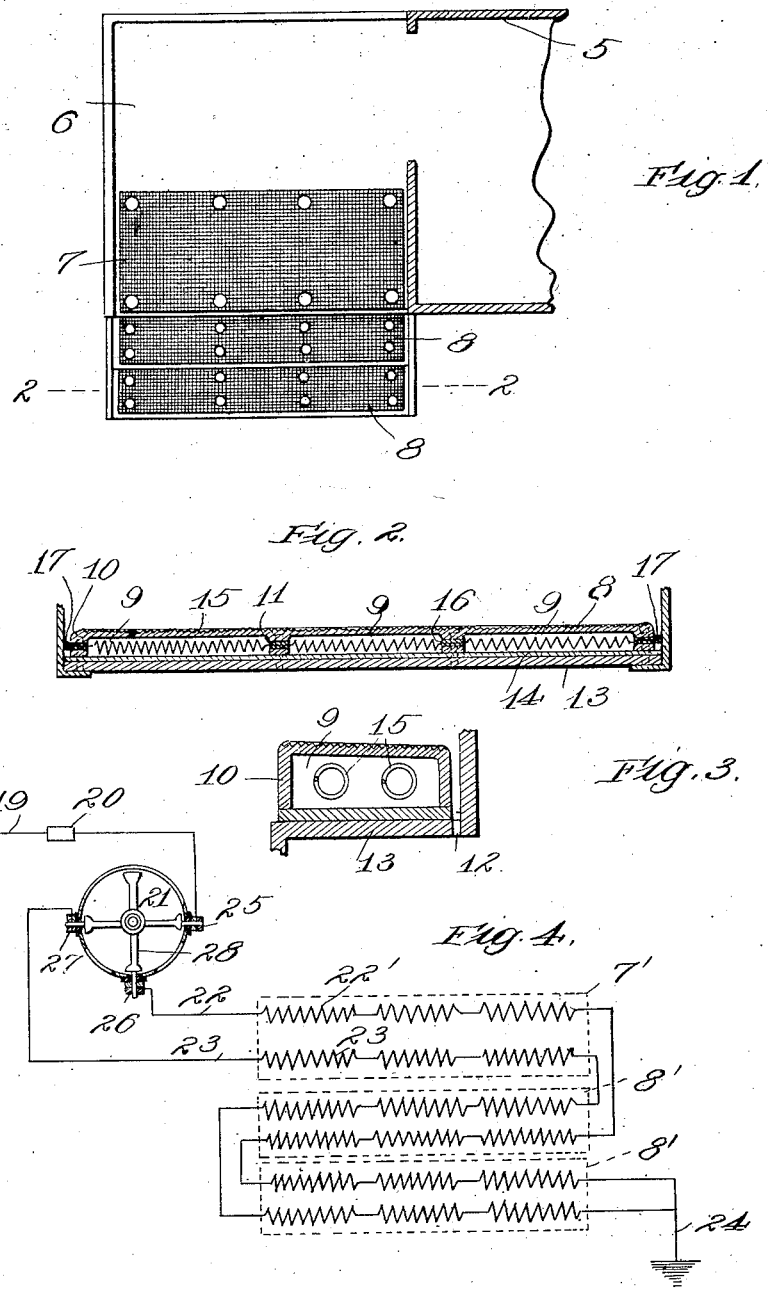

WILLIAM P. STEPHENSON, OF LONDON, ONTARIO, CANADA.

STEP AND TREAD PLATE.

1,062,199.  Specification of Letters Patent.  Patented May 20, 1913.

Application filed June 13, 1912. Serial No. 703,549.

*To all whom it may concern:*

Be it known that I, WILLIAM P. STEPHENSON, a subject of the King of Great Britain, and a resident of the city of London, in the county of Middlesex, in the Province of Ontario, Canada, have invented new and useful Improvements in Step and Tread Plates, of which the following is a specification.

This invention relates to improvements in step and tread plates and more especially to that class of the same designed to prevent slipping.

The object of the device is the provision of a tread plate for general use both in connection with steps for cars and houses and also for any other structures where the same may be applicable, such as a sidewalk or pavement.

A further object of the invention is to prevent the accumulation of snow and ice upon such places and steps by the application of heat or some warming means to the step plate positioned thereon.

While these objects may be accomplished in different manners, I have illustrated one embodiment of the invention as carried out by the employment of electricity as a heating agent for the step plates and in which connection the same is especially applicable to use with electric cars.

It is obvious that the regulated heating of the step plates rendering the accumulation of ice and snow thereon impossible, inures to the benefit of safety to the traveling public.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like designating numerals refer to corresponding parts throughout the several views: Figure 1 is a plan view of the two steps and platform of a car provided with tread plates of the present design, Fig. 2 is a longitudinal vertical sectional view taken upon line 2—2 of Fig. 1, Fig. 3 is a vertical transverse sectional view through one of said steps illustrated above, and Fig. 4 is a diagrammatic view showing one form of electrical connections for the device.

Further referring to the drawings, a portion of an electric car 5 is shown having an end platform 6 thereof provided with a floor tread plate 7 while similar plates 8—8 of less width are secured to the two steps of the car leading to the said platform.

As both the platform and step plates are of identical construction, the sectional view shown in Fig. 2 as well as description thereof is equally applicable to both plates. For the purpose of supplying heat beneath the tread or upper surface of said plates, the body portion of the latter is hollowed out forming rectangular chambers 9 running the entire width of the plates and bounded by the depending outer sides 10 and the separating partitions 11. The upper exposed face of the plates is preferably roughened to prevent slipping and may also be slightly inclined rearwardly as best shown in Fig. 3, to allow any accumulating slush and water to flow off of the step plate and through the rear openings 12 of the step itself as 13.

For mounting the plates upon a platform, walk or step, an insulated or fibrous base plate 14 may be employed if desired. While other means of heating said plates may be employed, it is preferred to accomplish this by passing resistance coils 15 in any desired number within the chambers 9 of the plates. This may be done by passing said coils therethrough in a parallel arrangement as herein shown, the wires of the coils being passed through insulating bushings 16 where the same traverse the walls or partitions of the chambers. The terminals of the coils leaving the plates as at 17 may be connected up in any desired manner of wiring with a source of electrical energy, such as the circuit wires of the electric car upon which the device is employed, while also any number of plates may be connected up in series therewith.

A manner of wiring for the present device is illustrated in Fig. 4, in which the trolley wheel lead wire 19 passes through the usual fuse 20 and thence communicates through any desired form of controlling switch 21 with two branch conducting wires 22 and 23, each of which wires connect with their respective resistance coils 22', 23' in the plates 7' and 8', shown in dotted lines, and again meet in a common ground wire 24. The switch herein disclosed illustrates the lead wire 19 as connected to a contact post 25, while the service wires 22 and 23 have their respective terminal contacts 26 and 27. A rotatable spider member 28 having four radial contact arms provides for dividing of the current into each of the wires 22 and 23, when any one of the said arms is in contact with the feed terminal 25, it being understood that the switch arms are all electrical conductors. A rheostat or current regulating switch may also be employed for controlling the degree of heat to be imparted to the coils within the plates.

It will be understood that the device is applicable for the provision of these plates to any forms of either stationary or movable steps as well as for walks and that different arrangements of coils or electrically heating devices for such plates may be furnished without departing from the spirit and scope of the present invention, as set forth in the appended claims.

Having thus fully described my invention and in what manner the same is desired for use, what I claim as new and desire to secure by Letters Patent is:

1. The combination with a door step having perforations therethrough, of a fibrous base plate, an integral metallic rearwardly sloping, step-shaped body having a plurality of chambers therein and mounted upon said plate, two series of resistance coils positioned through all of said chambers, two sets of terminals for said coils projecting exteriorly of said plate, means for connecting one set of terminals with a ground wire, service wires connected to the other set of terminals, a trolley wheel lead wire, and controlling means positioned between the latter and said service wires and in circuit with said feed and lead wires.

2. The combination with a step having an opening therethrough at the rear edge thereof, of an insulating base plate resting thereon, an inverted member U-shaped in cross-section mounted on said base plate, the upper surface of said member being roughened and sloping rearwardly, said base plate and member being spaced from said opening to present an unrestricted passage, and an electrical heating unit disposed within said member.

In testimony whereof, I have signed in the presence of the two undersigned witnesses.

WILLIAM P. STEPHENSON.

Witnesses:
P. J. EDMUNDS,
E. BEDFORD.

---

Copies of this patent may be obtained for five cents each, by addressing the "Commissioner of Patents. Washington, D. C."